Figure 1:
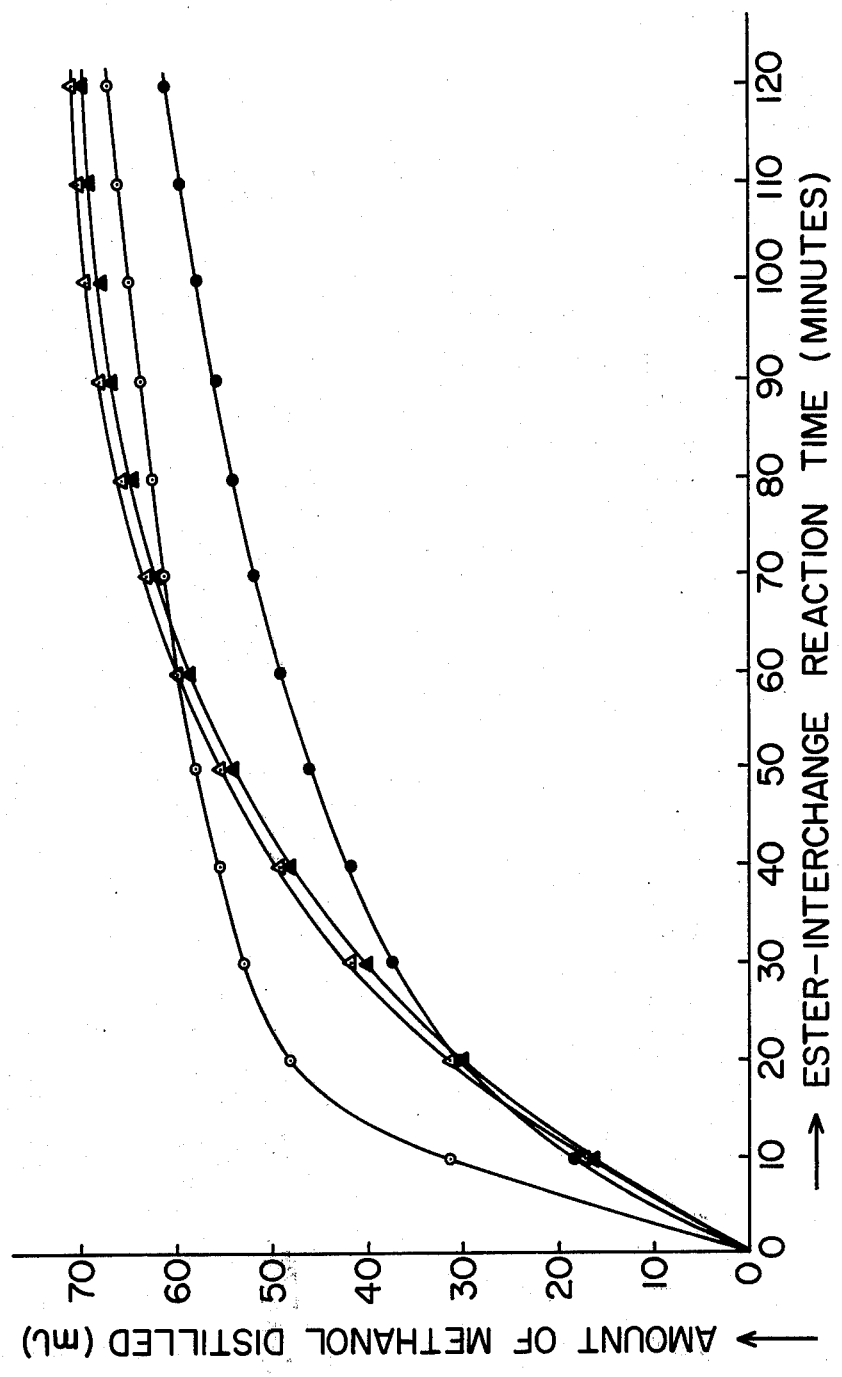

United States Patent [19]

Omoto et al.

[11] 4,058,507

[45] Nov. 15, 1977

[54] PROCESS FOR PREPARING POLYESTERS

[75] Inventors: Yorihiko Omoto, Ehime; Tadashi Konishi, Matsuyama; Shigehiro Ichihara, Matsuyama; Hisanori Murai, Matsuyama, all of Japan

[73] Assignee: Teijin Limited, Osaka, Japan

[21] Appl. No.: 647,887

[22] Filed: Jan. 9, 1976

[30] Foreign Application Priority Data

Dec. 18, 1975 Japan .................................. 50-150128

[51] Int. Cl.$^2$ ........................................... C08G 63/22
[52] U.S. Cl. ............................... 260/75 M; 260/75 R; 560/76
[58] Field of Search ................ 260/75 R, 75 P, 75 M, 260/475 P, 475 PR

[56] References Cited

U.S. PATENT DOCUMENTS

| | | | |
|---|---|---|---|
| 3,171,828 | 3/1965 | Isaacs et al. | 260/75 P |
| 3,321,444 | 5/1967 | Hoyer et al. | 260/75 R |
| 3,385,830 | 5/1968 | vom Orde et al. | 260/475 P |
| 3,391,122 | 7/1968 | Bice et al. | 260/475 P |
| 3,420,801 | 1/1969 | Fitz | 260/475 P X |
| 3,489,722 | 1/1970 | Kotani et al. | 260/75 P |
| 3,962,189 | 6/1976 | Russin et al. | 260/75 R |

*Primary Examiner*—Lucille M. Phynes
*Attorney, Agent, or Firm*—Fitzpatrick, Cella, Harper & Scinto

[57] ABSTRACT

A process for preparing a polyester which comprises reacting a di-lower alkyl ester of a difunctional carboxylic acid at least 90 mole% of which consists of terephthalic acid with a polymethylene glycol containing 2 to 10 carbon atoms at least 90 mole% of which consists of ethylene glycol in the presence of an ester-interchange reaction catalyst to form an ester-interchange reaction product, and then polycondensing it in the presence of a polycondensation catalyst, wherein a substantially uniform solution in ethylene glycol of (A) 20 to 150 millimole%, based on said di-lower alkyl ester of the difunctional carboxylic acid, of calcium acetate and (B) 2 to 25 millimole%, based on said di-lower alkyl ester, of cobalt acetate is used as the ester-interchange reaction catalyst.

13 Claims, 1 Drawing Figure

PROCESS FOR PREPARING POLYESTERS

This invention relates to a highly polymerized polyester comprising an ethylene terephthalate unit as a main structural unit. More specifically, the invention relates to a process for preparing a fiber-forming polyester, especially polyethylene terephthalate, in which at least 80 mole% of its structural units consists of an ethylene terephthalate unit.

A process has previously been known to form a fiber-forming polyester by reacting a di-lower alkyl ester of a difunctional carboxylic acid at least 90 mole% of which consists of terephthalic acid with a polymethylene glycol containing 2 to 10 carbon atoms at least 90 mole% of which consists of ethylene glycol in the presence of an ester-interchange catalyst to form an ester-interchange reaction product, and then polycondensing it in the presence of a polycondensation catalyst. This process affords a polyester in which at least 81 mole% of the entire recurring units consists of an ethylene terephthalate unit.

Various metal compounds have hitherto been suggested as the ester-interchange catalyst, and it has been known that alkaline earth metal compounds soluble in the ester-interchange reaction mixture, especially calcium compounds such as calcium acetate and calcium benzoate, are suitable as ester-interchange catalysts because they reduce the yellowish color of the resulting polyester, and have high catalytic activity, and that an antimony compound such as antimony trioxide, antimony pentoxide, or antimony potassium tartrate or an oxide of germanium is suitable as the polycondensation catalyst (U.S. Pat. No. 3,171,828).

The United States Patent also suggests that in order to prevent the color formation, particularly of yellowness of the resulting polyester, and/or the production of insoluble precipitates, a catalyst consisting essentially of a catalyst alkaline earth metal compound is used as the ester-interchange catalyst, and a phosphorus-containing compound is added to the ester-interchange reaction product after the substantial completion of the ester-interchange reaction and before the polycondensation reaction, thereby to inactivate the ester-interchange catalyst, and to convert it to a compound soluble in the ester-interchange reaction product and the polyester finally obtained.

Our investigations, however, led to the discovery that the process of the United States Patent suffers from various defects, such as:

i. The color of the finally obtained polyester is still yellowish.

ii. The final polyester contains fine insoluble and infusible solid impurities which cause the clogging of spinning orifices when a melt of the polyester is melt-spun through a spinneret, and thus make it difficult to perform the spinning operation. In addition, these impurities cause wraps at the time of drawing the resulting as-spun filaments.

iii. Attempts to filter the ester-interchange reaction product so as to remove the solid impurities before the polycondensation reaction of this product, however, result in the clogging of a filter screen within short periods of time, and the screen must be exchanged or washed incessantly.

Accordingly, it is an object of this invention to provide a more beautiful white polyester assuming a less yellowish color, and a process for its preparation.

Another object of this invention is to provide a process for preparing polyesters, which affords an ester-interchange reaction product that can be filtered through a filter screen with reduced clogging and thus reduces the number of screen exchanging and washing operations and a polyester that does not cause the clogging of the orifices of a spinneret and can be melt-spun into filaments which do not undergo wraps at the time of drawing.

Still another object of this invention is to provide a catalytic composition for ester-interchange reaction which can give beautiful white polyester with reduced yellowness and has a higher catalytic activity.

A further object of this invention is to provide a polyester having superior heat stability at the time of melting, and a process for its preparation.

Other objects and advantages of this invention will become apparent from the following description.

According to this invention, the above objects and advantages can be basically achieved by a process for preparing a polyester which comprises reacting a di-lower alkyl ester of a difunctional carboxylic acid at least 90 mole% of which consists of terephthalic acid with a polymethylene glycol containing 2 to 10 carbon atoms at least 90 mole% of which consists of ethylene glycol in the presence of an ester-interchange catalyst to form an ester-interchange reaction product, and then polycondensing it in the presence of a polycondensation catalyst, wherein the ester-interchange catalyst is a substantially uniform solution in ethylene glycol of (A) 20 to 150 millimole% of calcium acetate and (B) 2 to 25 millimole% of cobalt acetate, the amounts being based on the di-lower alkyl ester of difunctional carboxylic acid.

The invention will be described below in greater detail.

1. Raw Materials and the Structural Units of the Resulting Polyester

The di-lower alkyl ester of a difunctional carboxylic acid used in the process of this invention is a di-lower alkyl ester of a difunctional carboxylic acid at least 90 mole% of which consists of terephthalic acid. Accordingly, at most 10 mole% of the alkyl ester may be a di-lower alkyl ester of another difunctional carboxylic acid.

Examples of the other difunctional carboxylic acid are aromatic difunctional carboxylic acids such as isophthalic acid, naphthalenedicarboxylic acids (e.g., 2,6-naphthalenedicarboxylic acid or 2,7-naphthalenedicarboxylic acid), 5-sodiumsulfoisophthalic acid, diphenyldicarboxylic acid, diphenylmethanedicarboxylic acid, diphenyletherdicarboxylic acid, and diphenoxyethanedicarboxylic acid, and aliphatic difunctional carboxylic acids such as adipic acid, sebacic acid or succinic acid.

The di-lower alkyl ester is a dimethyl ester or a diethyl ester, the dimethyl ester being preferably used in the process of this invention.

Preferably, the di-lower alkyl ester of difunctional carboxylic acid is one in which the proportion of dimethyl terephthalate is at least 93 mole%, especially, one consisting essentially of dimethyl terephthalate alone.

The polymethylene glycol used in the process of this invention is one in which the proportion of ethylene glycol is at least 90 mole%. Accordingly, at most 10 mole% of it may comprise another polyethylene glycol, preferably such as trimethylene glycol, tetramethylene glycol, hexamethylene glycol, or decamethylene glycol.

Preferably, the polymethylene glycol is one at least 95 mole% of which consists of ethylene glycol, especially one consisting essentially of ethylene glycol alone.

Thus, the polyesters in which at least 90 mole%, especially at least 93 mole%, of the entire recurring units consists of an ethylene terephthalate recurring unit, especially a polyester consisting essentially of an ethylene terephthalate recurring unit alone, are preferred in the present invention.

2. Ester-Interchange Reaction Catalyst

As previously stated, the present invention is characterized in that the di-lower alkyl ester of difunctional carboxylic acid is reacted with the polymethylene glycol in the presence of, as an ester-interchange reaction catalyst, a substantially uniform solution in ethylene glycol of (A) 20 to 150 millimole% of calcium acetate and (B) 2 to 25 millimole% of cobalt acetate, the amounts being based on the di-lower alkyl ester of the difunctional carboxylic acid.

Preferably, the amounts of calcium acetate and cobalt acetate are 30 to 100 millimole%, especially 50 to 80 millimole%, and 3 to 20 millimole%, especially 3 to 15 millimole%, respectively, based on the di-lower alkyl ester of difunctional carboxylic acid. Especially preferably, within the above-specified ranges, the molar ratio of cobalt acetate/calcium acetate is 0.03 to 0.5.

Calcium acetate is usually available as monohydrate, and cobalt acetate as tetrahydrate. The solubility of calcium acetate monohydrate in 100 ml. of ethylene glycol is about 11 g at 40° C., about 7 g at 80° C., and about 6 to 5 g at 100° to 160° C. The solubility of cobalt acetate tetrahydrate in ethylene glycol is higher than that of calcium acetate monohydrate.

In the preparation of the ester-interchange reaction catalyst, it is preferred to mix calcium acetate and cobalt acetate in ethylene glycol so that these compounds dissolve substantially uniformly in ethylene glycol. It is especially advantageous to use an ester-interchange catalyst prepared by using calcium acetate monohydrate in a concentration of 1 to 6 g, especially 2 to 5 g, per 100 ml. of ethylene glycol, and substantially uniformly dissolving the calcium acetate monohydrate and cobalt acetate tetrahydrate in the ethylene glycol so that the proportions of these compounds are as specified hereinabove.

In the present invention, a substantially uniform solution of calcium acetate and cobalt acetate in ethylene glycol is added as a catalyst to the ester-interchange reaction system, and it is not the practice to add a solution of calcium acetate in ethylene glycol and a solution of cobalt acetate in ethylene glycol separately in the reaction system. Accordingly, when a solution of calcium acetate and a solution of cobalt acetate are prepared separately, it is necessary to mix the solutions, and use the resulting uniform solution as the ester-interchange reaction catalyst. The suitable temperature at which these compounds are dissolved in ethylene glycol is 20° to 150° C., preferably 40° to 130° C. But this temperature is not critical.

Water is present in a small amount in the reaction system of the di-lower alkyl ester of difunctional carboxylic acid and the polymethylene glycol. The water is ascribable to water present in the starting polymethylene glycol and water of crystallization in calcium acetate or cobalt acetate used as the catalyst. Furthermore, when with the progress of the ester-interchange reaction, a side reaction of forming a condensation product of polymethylene glycol such as diethylene glycol occurs, for example, by the self-condensation of ethylene glycol, water is also formed as a by-product.

Thus, the ester-interchange reaction system contains 0.03 to 0.2% by weight, especially 0.04 to 0.15% by weight of water based on the entire reaction mixture.

We have found that as shown in FIG. 1 accompanying this application, the ester-interchange reaction mixture contains water, the catalytic activity of calcium acetate in the relatively last stage of the ester-interchange reaction is lower than that of cobalt acetate, and that when the water content of the ester-interchange reaction mixture becomes at least about 0.03% by weight, the catalytic activity of calcium acetate is drastically reduced, whereas the catalytic activity of cobalt acetate is hardly affected by the water content of the ester-interchange reaction mixture.

According to this invention, the rate of the ester-interchange reaction in its intermediate and last stages, especially the latter, can be markedly increased over that in the case of using calcium acetate along, by adding a substantially uniform solution of calcium acetate and cobalt acetate in ethylene glycol is a catalyst to the ester-interchange reaction system. In addition, this serves to reduce the yellowness of polyesters prepared through a polycondensation step, and to impart a beautiful white color to the product.

3. Ester-Interchange Reaction

In the present invention, the ester-interchange reaction between the di-lower alkyl ester and the polymethylene glycol is carried out in the presence of a substantially uniform solution of cobalt acetate and calcium acetate in ethylene glycol (catalyst) under such conditions that can distill out a lower alcohol corresponding to the di-lower alkyl ester of difunctional carboxylic acid, for example, methanol.

No special conditions are required in carrying out the ester-interchange reaction, but conventional conditions employed for the preparation of polyethylene terephthalate or polyesters containing an ethylene terephthalate unit as a main structural unit by an ester-interchange method are feasible. Generally, it is carried out at atmospheric pressure or a somewhat elevated pressure at a temperature of 140° to 250° C. while distilling off the resulting alcohol.

When the ester-interchange reaction has proceeded to an extent of at least 98% of theory, a phosphorus compound is advantageously added to the ester-interchange reaction system to inactivate calcium acetate and cobalt acetate. The addition of phosphorus compounds is also advantageous because it can render calcium acetate and cobalt acetate soluble in the ester-interchange reaction product and the polyester as a final product.

The theoretical value of the ester-interchange reaction means that the lower alcohol (e.g., methabol) is distilled out from the ester-interchange reaction system in an amount nearly two times the mole of the di-lower alkyl ester of difunctional carboxylic acid added to the reaction system. When the extent of progress of the ester-interchange reaction is measured actually, especially at the last stage of the ester-interchange reaction, it is preferred to determine the mole equivalent of the ester-type lower alkyl group, such as methyl, of the ester-interchange reaction mixture, dividing it by the mole equivalent of the lower alkyl groups of the di-lower alkyl ester of difunctional dicarboxylic acid, and calculating the extend of progress from the resulting quotient ($x$) in accordance with the formula $100(1 - x)$ (%).

The phosphorus compound can be added to the ester-interchange reaction mixture at any stage before or after the substantial completion of the ester-interchange reaction if the ester-interchange reaction has proceeded to an extent of at least 98% of theory. Preferably, however, the phosphorus compound is added to the ester-interchange reaction mixture before the ester-interchange reaction has been completed substantially, especially at a time when the ester-interchange reaction has proceeded to an extent of 98.5 to 99.6% of theory, to inactivate the catalyst.

It has hitherto been thought that when a phosphorus compound is added to the reaction system before the substantial completion of the ester-interchange reaction, methanol is formed in the subsequent polycondensation step, and for example, the degree of pressure reduction does not increase, and long periods of time are required for the polycondensation, which in turn deteriorates the quality of the resulting polyester. According to the investigations of the inventors, however, it is clear, as shown in FIG. 1, that the catalyst activity of cobalt acetate is reduced to a lesser degree than that of calcium acetate especially in the later stage of the ester-interchange reaction, and therefore, according to the progress of this invention using a catalyst consisting of calcium acetate and cobalt acetate, the ester-interchange reaction can be carried out within short periods of time, and the formulation of by-product condensation product of polymethylene glycol, such as diethylene glycol, whose amount increases at the later stage of the ester-interchange reaction can be inhibited.

Preferably, the phosphorus compound is added to the ester-interchange reaction mixture after the ester-interchange reaction has proceeded to an extent of at least 98%, but before the substantial completion of this reaction, especially when the ester-interchange reaction has proceeded to an extent of 98.5 to 99.6%, especially 99 to 99.5%, of theory. This can reduce the amounts of a condensation product of ethylene glycol, such as diethylene glycol, as a by-product in the ester-interchange reaction, and allows the subsequent polycondensation reaction to proceed easily. Furthermore, suprisingly, this leads to polyesters having a high softening point.

We have found that if the phosphorus compound is added to the ester-interchange reaction product when the ester-interchange reaction has proceeded to an extent of at least 98% of theory, but before the substantial completion of the reaction, the following relation is established between the concentration of the terminal methyl group ([CH$_3$]) of the ester-interchange reaction product and the softening point (Sp) of a polyester obtained by polycondensing the ester-interchange reaction product.

$$\Delta Sp \approx 7.7 \times 10^{-3} \times \Delta [CH_3]$$

wherein $\Delta$ Sp(°C) represents the increase or decrease of the softening point of the polyester according to the increase or decrease ($\Delta[CH_3]$) of the terminal methyl group concentration, and the unit of $\Delta[CH_3]$ is the equivalent of the terminal methyl groups/10$^6$ grams of the ester-interchange reaction product.

The addition of the phosphorus compound at the above-specified time can increase the softening point of the resulting polyester probably because it can effectively reduce the amount of a condensation product of ethylene glycol, such as diethylene glycol, formed vigorously at the last stage of the ester-interchange reaction.

The phosphorus compound conveniently used for inactivating the ester-interchange reaction catalyst in this invention is at least one phosphorus-containing compound selected from the group consisting of phosphorus acid, phosphoric acid, lower alkyl esters, phenyl esters, and C$_{2-10}$ polymethylene glycol esters of these acids. Specific examples of the esters are trimethyl phosphate, trimethyl phosphite, triethyl phosphate, tributyl phosphite, triphenyl phosphate, triphenyl phosphite, mono(hydroxyethyl) phosphate, and mono(hydroxyethyl) dimethyl phosphates. Especially preferred phosphorus compounds are phosphorous acid, phosphoric acid, mono-, di-, or tri-methyl esters of these acids, and mono-, di- or tri-ethylene glycol esters of these acids.

Advantageously, the phosphorus compound is added as an ethylene glycol solution to the ester-interchange reaction product. The amount of the phosphorus compound is 0.7 to 1.5 moles, preferably 0.8 to 1.2 moles, per mole of the total amount of calcium acetate and cobalt acetate as catalyst.

4. Filtration of the Ester-Interchange Reaction Product

When the phosphorus compound is added to the ester-interchange reaction mixture at the last stage of, or after, the ester-interchange reaction, the calcium acetate and cobalt acetate are inactivated, and are mostly converted to compounds soluble in the reaction mixture and the resulting polyester. We have found that even when the calcium acetate and the cobalt acetate are used as the ester-interchange reaction catalyst and the ester-interchange reaction catalyst is inactivated and converted to a polyester-soluble compound by adding the phosphorus compound, after the addition, the ester-interchange reaction product is directly subjected to a polycondensation reaction to obtain a polyester of the desired degree of polymerization, the resulting polyester, when melt spun through a spinneret, may cause the clogging of the spinning orifices, or makes it difficult to perform the spinning operation or to draw the as-spun filaments because of the occurrence of wraps. Investigations have led to the discovery that this is because a part of the ester-interchange reaction catalyst still remains as a solid insoluble matter in the polyester. It is advantageous therefore to remove these troubles associated with the spinning of the resulting polymer by passing the ester-interchange reaction mixture through a filter (200 to 1,000 Tyler's mesh) before submitting it to a polycondensation reaction after addition of the phosphorus compound, for example, at the time of transferring the ester-interchange reaction product from an ester-interchange reactor to a polycondensation reactor, thereby to separate impurities insoluble in the polyester, and then subjecting it to a polycondensation reaction.

In such a method, filters of small mesh sizes are required in order to separate the impurities as fully as possible. This naturally results in the clogging of the filters, and it is necessary to wash or exchange the filters incessantly. The washing or exchanging of the filter is advantageously performed at a temperature of as high as 200° to 230° C. at which the ester-interchange reaction product is in the molten state and is maintained at a low viscosity, but this operation is difficult, and is also dangerous. Accordingly, in order to remove the insoluble impurities in the polyester which cause these troubles, the best measure is to inhibit the formation of these impurities as much as possible. We have now found that this can be accomplished by using a substantially uniform solution of calcium acetate and cobalt acetate in ethylene glycol as the ester-interchange catalyst.

This objective cannot be achieved by merely using calcium acetate and cobalt acetate conjointly as the ester-interchange catalyst, nor by adding a solution of calcium acetate in ethylene glycol and a solution of cobalt acetate in ethylene glycol separately to the ester-interchange reaction system. Accordingly, the present invention is clearly distinguished from a method in which calcium acetate and cobalt acetate are merely conjointly used as the ester-interchange reaction catalyst, and also from a method in which a solution of calcium acetate in ethylene glycol and a solution of cobalt acetate in ethylene glycol, separately prepared, are used separately.

According to the process of this invention in which a substantially uniform solution of calcium acetate and cobalt acetate in ethylene glycol is used as the ester-interchange reaction catalyst, about 30 Kg or more of the ester-interchange reaction product can be filtered per unit filtration area (cm$^2$) on a 400 Tyler's mesh stainless steel gauze, for example, as shown in a specific working example to be given hereinbelow, and the troubles occurring at the time of spinning are markedly reduced. This is surprising in view of the fact that when a solution of calcium acetate in ethylene glycol is used as the ester-interchange reaction catalyst, only about 10 Kg of the ester-interchange reaction product per unit filtration area (cm$^2$) can be filtered on the same 400 Tyler's mesh gauze.

Furthermore, when a solution of calcium acetate in ethylene glycol and a solution of cobalt acetate in ethylene glycol are separately added, only about 7.5 Kg of the ester-interchange reaction product per unit filtration area (cm$^2$) can be filtered using the same wire gauze.

5. Polycondensation Reaction

As stated hereinabove, the di-lower alkyl ester of a difunctional carboxylic acid at least 90 mole% of which consists of terephthalic acid is reacted with a polymethylene glycol containing 2 to 10 carbon atoms at least 90 mole % of which consists of ethylene glycol in the presence of, as an ester-interchange reaction catalyst, a substantially uniform solution of calcium acetate and cobalt acetate in ethylene glycol, and the resulting ester-interchange reaction product is polycondensed in the presence of a polycondensation catalyst until a polyester of the desired degree of polymerization is obtained.

The polycondensation catalyst may be a compound containing antimony, germanium, or titanium, and antimony trioxide, antimony pentoxide, germanium dioxide, tetrabutyl titanate, and tetraethyl titanate are used preferably. Of these, antimony trioxide is especially preferred.

It is advantageous in this invention that instead of adding the polycondensation catalyst after transferring the ester-interchange reaction product to a polycondensation reactor, the polycondensation catalyst is added to the ester-interchange reaction mixture while it is still in an ester-interchange reactor, and the mixture is stirred and filtered using a suitable filter, after which the filtered ester-interchange reaction product is transferred to the polycondensation reactor.

This procedure makes it possible to dissolve and/or finely disperse polycondensation catalysts which are sparingly soluble in polyesters, such as antimony trioxide, in the ester-interchange reaction product, and to separate and remove relatively coarse dispersed particles of the polycondensation catalyst by the filter. Accordingly, the various troubles that occur during the melt-spinning of the polyester obtained by the polycondensation reaction, such as the clogging of orifices and the occurrence of wraps during drawing, can be prevented more effectively.

The polycondensation catalyst can be added to the ester-interchange reaction product before or after adding the phosphorus compound to the ester-interchange reaction product. However, it is advantageous that after adding the phosphorus compound to the ester-interchange reaction product, the entire mixture including the polycondensation catalyst is stirred for at least 10 minutes, preferably at least 20 minutes, at the temperature (about 220° to 275° C. ) of the reaction system at the last stage of the ester-interchange reaction. This makes it possible to dissolve and/or finely disperse the polycondensation catalyst better in the ester-interchange reaction product.

When the polycondensation catalyst is a sparingly soluble compound such as antimony trioxide, it can be rendered well soluble and/or well dispersible finely in the ester-interchange reaction product by adding it to the ester-interchange reaction product before adding the phosphorus compound. This can be accomplished without impairing the catalytic activity of the polycondensation catalyst in the subsequent polycondensation step.

No special conditions are required for the polycondensation reaction, but any conditions usually employed for preparing polyethylene terephthalate or a polyester comprising an ethylene terephthalate unit as a main structural unit from the ester-interchange reaction product are feasible in the present invention. Generally, the ester-interchange reaction product is polycondensed at a reduced pressure of at least 5 mmHg, preferably at least 0.5 mmHg at a temperature of 250° to 310° C. at which the polycondensation reaction product is in the molten state, while distilling off the resulting polymethylene glycol (e.g., ethylene glycol), until a polyester of the desired degree of polymerization is obtained.

Preferably, in the present invention, the phosphorus compound is added to the ester-interchange reaction product after the ester-interchange reaction has proceeded to an extent of at least 98% of theory but before the substantial completion of the ester-interchange reaction thereby to inactivate calcium acetate and cobalt acetate as the ester-interchange reaction catalyst, and then the reaction product is polycondensed. Surprisingly, this procedure led to an improvement in the heat stability of the resulting polyester. Since the resulting polyester is generally fabricated in the molten state, it is frequently exposed to high temperatures of, say, 270° to 310° C. For example, a melt spinning apparatus frequently has a dead space in which the polyester at such a high temperature as mentioned above resides for long periods of time. In such a case, the polyester obtained by the present invention which has good heat stability is not deteriorated by heat, and thus does not cause serious troubles during the spinning operation. Furthermore, this polyester undergoes little weight loss in air when molten and exposed to high temperatures, and therefore, has the advantage that foreign matter does not significantly adhere to the surface of the spinning orifices and thus, the occurrence of wrap by the foreign matter is reduced.

As stated hereinabove, according to the present invention, the use of a substantially uniform solution of calcium acetate and cobalt acetate in ethylene glycol as an ester-interchange reaction catalyst makes it possible to perform the ester-interchange reaction more rapidly so as to shorten the total time required for the ester-interchange reaction, to inhibit the formation in the ester-interchange product of polyester-insoluble fine impurities which cause the difficulty of spinning, and also to prepare a polyester having good heat stability in the molten state. Furthermore, the process of this invention affords a beautiful white polyester of reduced yellowness which can obviate difficulties associated with the spinning operation and has a superior commerical value.

In the performance of the present invention, it is permissible to use a monofunctional compound capable of being bonded to the terminals of a polyester, such as benzoylbenzoic acid, an alkali metal salt of phenolsulfonic acid or a γ-hydroxypropanesulfonic acid salt, or a trifunctional or higher compound such as pentaerythritol in an amount which maintains the properties of a substantially linear polyester.

Furthermore, according to the desired properties, a delusterant such as titanium dioxide, a coloring agent such as carbon black, an ultraviolet absorber, an antistatic agent, or a fire-retarding agent, etc. can also be used. Preferably, these additives are non-reactive with the polyester. The suitable time of adding such an additive is determined according to its properties. For example, a compound which is insoluble in the polyester and infusible, such as titanium dioxide, is preferably added after the ester-interchange reaction but before the polycondensation reaction and also before the ester-interchange reaction product is passed through a filter screen. The amount of titanium dioxide is suitably 0.05 to 3% by weight based on the polyester. We have found that titanium dioxide uniformly and finely dispersed in the resulting polyester not only serves as a delusterant, but also gives rise to the improvement of the drawability of as-spun filaments.

The following Examples illustrate the present invention in greater detail.

The various properties described in the present specification and the following examples were measured by the following methods.

6. Measurement Methods

1. Intrinsic Viscosity [η]

0.1200 g of sample polymer is weighed precisely, and 10 ml. of o-chlorophenol at 35° C. is added. The mixture is stirred at 100° C. for 90 minutes to form a solution. The solution is immersed for 10 minutes in a water bath at 25° C. Then, 5 ml. of the solution is placed in an Ostwald viscometer, and it is immersed for 30 minutes in a water bath held at 35° C. The flowing time ($t$, sec.) of the solution is measured. At the same temperature, the flowing time ($t_o$, sec.) of o-chlorophenol alone is measured. The intrinsic viscosity of the polymer is obtained from $t$ and $t_o$.

2. Softening Point (measurement by a penetrometer of polymer

A sample polymer is heat-treated at 140° C. for 1 hour, and then molded into an article with a size of 2 × 2 × 1.5 (mm). The molded article is set under a plunger with a load of 10 g. That part of the plunger which comes into contact with the sample is of a planar circular shape with a diameter of 3 mm. Then, the temperature is raised at a rate of 1.2° C/min., and the point at which the sample begins to become softened and the plunger falls down over 0.5 mm is determined electrically, and made the softening point (° C) of the sample polymer.

3. Terminal Methyl Group Concentration [($CH_3$) (equivalent/$10^6$g) for short] and the Content of Diethylene Glycol (DEG for short)

About 2 g of a sample polymer or ester-interchange reaction product is pulverized and precisely weighed, and 10 ml. of hydrazine hydrate is added. The mixture is heated under reflux for about 30 minutes, and cooled. The resulting precipitate is separated centrifugally. The supernatant liquid is analyzed by gas chromatography. The [$CH_3$] is obtained by quantitatively determining the resulting $CH_3OH$, and the content of DEG, by quantitatively determining the resulting DEG.

Conditions for Gas-chromatography i. DEG determination
 a. column packings: Porapack Q (80 to 100 mesh)
 b. column temperature: 205° C.
 c. carrier gas: $N_2$
 d. column: stainless steel (1 mm × 3 mm diameter)
 e. retention time: 12.5 minutes ii. [$CH_3$]
 a. column packings: Porapack Q
 b. column temperature: 105° C.
 c. carrier gas: $N_2$
 d. column: stainless steel (1 m × 3 mm diameter)
 e. retention time: 2 minutes 4. Water Content a. Water Content of the Ester-interchange Reaction Product 2 g of a sample is precisely weighed, and placed in a 25 ml. measuring flask. Dioxane is added to make the total volume 25 ml. The flask is sealed, and the contents are stirred at room temperature by means of a magnet stirrer. After precisely weighing 2 ml. of this solution, the water content is measured by the Karl-Fischer method. When the sample cannot be uniformly dissolved under the above conditions, 100 ml. of dioxane is used.

b. Water Content of the Ethylene Glycol Solution of the Catalyst and of the Ethylene Glycol The water content is measured directly by the Karl-Fischer method.

5. Color (L-value and b-value)

L and b denote those of Hunter's Color Diagram in which L represents lightness. The greater the L value, the lighter is the color. On the other hand, the positive side of b means yellow, and the negative side of b means blue. The greater the absolute value of b, the deeper is the color shade.

6. Weight Loss

A sample polymer is pulverized, and dried at reduced pressure at 160° C. for 3 hours. 5 g of the dried polymer is precisely weighed, and treated by a gear aging tester (a product of Tester Sangyo Kabushiki Kaisha) at 280°

C. for 16 hours. Then, it weight is measured. The weight determined is divided by the original weight of the polymer and then multiplied by 100. The result is the weight loss of the polymer (% by weight).

EXAMPLE 1 a. Preparation of a Solution of Calcium Acetate and Cobalt Acetate in Ethylene Glycol A tank located within a circulating circuit of a homogenizer was charged with 30 Kg of the ethylene glycol, 1.22 Kg (6.925 moles) of calcium acetate monohydrate and 0.18 Kg (0.723 mole) of cobalt acetate tetrahydrate, and these materials were homogenized at room temperature for 45 minutes. The mixture was then transferred into a catalyst preparing tank held at 80° C. and stirred for 2 hours. The solution was allowed to cool to room temperature to prepare a catalyst solution which was a reddish violet clear solution with a water content of 1.05% by weight.

b. Ester-interchange Reaction

An ester-interchange reaction tank equipped with a rectification column, a condenser, a stirrer and a heating device was charged with 2,000 Kg of dimethyl terephthalate and 1,250 Kg of ethylene glycol, and then with stirring, all the catalyst solution prepared in (a) above was added. Then, the mixture was heated.

Methanol began to distill off when the temperature of the inside of the reaction tank reached about 150° C., and in 140 minutes when the inside temperature reached 220° C., 820 ml. of the distillate was obtained. At this time, 0.69 g of phosphorous acid was added to the reaction system, and the mixture was stirred. Then, 0.82 Kg of antimony trioxide was added, and the mixture was stirred at 240° to 260° C. for 30 minutes. Then, 10 Kg of anatase type titanium dioxide was added as an ethylene glycol slurry, followed by stirring for about 5 minutes.

In order to examine the conversion of esterinterchange at the time when phosphorous acid was added, a part of the reaction mixture was sampled, and its terminal methyl group concentration (ester methyl group) was measured and found to be 110 eq/$10^6$ g. This corresponded to an ester-interchange conversion of 98.6%.

c. Filtration of the Ester-interchange Product

The ester-interchange reaction product obtained in (b) above was passed in the molten state in an atmosphere of nitrogen at 1.5 Kg/cm$^2$ .G through a filter screen (400 Tyler's mesh) with a filtration area of 1700 cm$^2$ which was located intermediate between the ester-interchange reactor and a polycondensation reactor to be described below. In about 5 minutes, all of the reaction product passed through the filter screen.

d. Polycondensation Reaction

A stainless steel polycondensation reactor equipped with an ethylene glycol distilling condenser, a stirrer, a vacuum generating device and a heating device was charged with the ester-interchange reaction product obtained after filtration in (c) above. The ester-interchange reaction product was first heated at 260° C to 270° C. in an atmosphere of nitrogen at atmospheric pressure for 15 minutes. Then, the pressure was reduced gradually, and at the same time, the temperature was raised gradually. When the pressure reached 0.3 mmHg and the temperature of the inside of the reactor reached 289° C. at the end of 160 minutes after methanol began to distill off, the polycondensation reaction ended.

e. Properties of the Resulting Polyethylene Terephthalate

Terminal methyl group concentration: 5 eq/$10^6$ g
[$\eta$]: 0.64
(Sp): 262.5° C.
DEG content: 0.75% by weight
Weight loss: 8.3% by weight
Color: L-value 68.5, b-value 3.5

EXAMPLE 2 a. The ester-interchange reaction and the polycondensation reaction were repeated using the same esterinterchange reactor and the same polycondensation reactor as used in Example 1 and repeating the procedures of (a) to (d) of Example 1 substantially faithfully. The scales of the reactions were the same as in Example 1, and the ester-interchange reactor and the polycondensation reactor were not washed at the end of each reaction. The limit of the usability of the filter screen was examined.

The time required for the filtration of the ester-interchange reaction product was 5 minutes in the first batch, but became gradually longer with the repetition of the reactions. It became 15 minutes in the 20th batch. Thereafter, with the repetition of the reactions, the time required for the filtration became longer somewhat abruptly, and causes confusion in the polycondensation reaction cycle and also complicates the control of the polycondensation reaction. It was therefore judged that in an ester-interchange reaction of the above scale, there is a limit in the usability of the filter material when the time required for the filtration reaches 15 minutes. This point corresponds to the time at which 30.5 Kg of the ester-interchange reaction product has been filtered through a 400 Tyler's -mesh filter screen per cm$^2$ of filtration area.

b. The ester-interchange reaction product obtained in (a) above after the filtration was converted to polyethylene terephthalate by the method of (d) in Example 1. The resulting polyesters had an intrinsic viscosity [$\eta$] of 0.61 to 0.62.

In order to examine the spinnability and drawability of the resulting polyesters, 1.0 ton of the polyester (1.8 tons as obtained) obtained in the third batch [$\eta$]=0.61) was spun at a melting temperature of 285° C. through a spinneret with 30 holes each having a diameter of 0.35 mm, a take-up rate of 1,100 m/min. and a discharge rate of 64 g/min. The filaments were wound up as 10 Kg of packages. At the beginning of the spinning, the pack pressure was 200 Kg/cm$^2$.G, and it was 220 Kg/cm$^2$.G at the end of the spinning (the 7th day). 100 of these packages were drawn at a draw ratio of 3.67 at a drawing temperature of 82° C. and a setting temperature of 230° C. (non-contact type). The draw speed was 800 m/min. The drawn filaments were taken up on a bobbin in an amount of 2.5 Kg.

No trouble was observed during the spinning, and the wrap percentage during drawing was 0.25%.

EXAMPLE 3 a. Preparation of a Solution of Calcium Acetate and Cobalt Acetate in Ethylene Glycol A tank located within a circulating circuit of a homogenizer was charged with 30 Kg of ethylene glycol and 1.22 Kg or calcium acetate monohydrate, and these materials were homogenized at room temperature for 45 minutes. Then, the mixture was transferred into a catalyst preparing tank held at 40° C., and stirred for 3 hours to form a solution of calcium acetate in ethylene glycol.

On the other hand, a solution of cobalt acetate in ethylene glycol was obtained by mixing 0.18 Kg of cobalt acetate tetrahydrate with 5 Kg of ethylene glycol at room temperature. The resulting solution was added to the ethylene glycol solution of calcium acetate prepared above, and the mixture was stirred for about 10 minutes at room temperature to form a uniform catalyst solution which was a reddish violet clear solution with a water content of 0.90% by weight.

b. Ester-interchange Reaction, the Filtration of the Ester-interchange Reaction Product, Polycondensation Reaction and the Properties of Polyethylene Terephthalate The same procedure as in Example 1, (b) was repeated except that all the ester-interchange reaction catalyst obtained in (a) above was used and 0.82 Kg of phosphoric acid was used instead of the phosphorous acid. An ester-interchange reaction product with a conversion of 98.9% was obtained.

The reaction product was passed in the molten state in an atmosphere of nitrogen at 1.5 Kg/cm$^2$.G through a filter screen (300 Tyler's mesh) with a filtration area of 1,700 cm$^2$. In about 5 minutes, all the reaction product passed through the filter screen.

The ester-interchanging reaction product so filtered was polycondensed in the same way as in Example 1, (d) to form polyethylene terephthalate having the following properties.

Terminal methyl group concentration: 5 eq./10$^6$g
[$\eta$]: 0.63
[Sp]: 262.4° C.
DEG content: 0.77% by weight
Weight loss: 8.0% by weight
Color: L-value 67.9, b-value 3.8

EXAMPLE 4

A 500 ml. four-necked flask equipped with a stirrer, a thermometer, a methanol refluxing condenser and a sampling opening was charged with 194 g of dimethyl terephthalate and 113 g of ethylene glycol, and the flask was immersed in a silicone oil bath whose temperature was maintained at 240° C. When the temperature of the inside of the flask reached 150° C. 10 g of an ethylene glycol solution containing 1.20% by weight of calcium acetate monohydrate and 0.25% by weight of cobalt acetate tetrahydrate (referred to as (a)) was added. From the time of adding the catalyst, the amount of methanol distilled out were checked and the water content of the reaction mixture was checked by sampling, and the ester-interchange reaction was continued. The results obtained are shown in Table 1.

Table 1

| Time (minutes) after the addition of the catalyst | 3 | 9 | 24 | 45 | 90 |
|---|---|---|---|---|---|
| Conversion of ester-interchange reaction (%, calculated from the amount of methanol distilled) | 10 | 50 | 80 | 90 | 99 |
| Water content (%) | 0.026 | 0.040 | 0.046 | 0.054 | 0.080 |

It is seen from the above results that with the progress of the ester-interchange reaction, the water content of the ester-interchange reaction mixture gradually increased, and especially at the last stage of the reaction, the water content increased markedly, and that the time required for the ester-interchange reaction from the intermediate to the last stage of the reaction accounted for a greater part of the total time required for the ester-interchange reaction.

For comparison, the above ester-interchange reaction was repeated in the same way as above except that 10 g each of an ethylene glycol solution containing 0.70% by weight of calcium acetate monohydrate (referred to as (b)), and an ethylene glycol solution containing 0.99% by weight of cobalt acetate tetrahydrate (referred to as (c)) was used instead of the catalyst solution (a) and the temperature of the silicone oil bath was adjusted to 205° ± 0.5° C. The experiments with these catalyst solutions (b) and (c) were for the purpose of demonstrating the catalytic activity of calcium acetate and of cobalt acetate in the catalyst system used in this invention, and also what effects the water content of the reaction system exerts on the catalytic activity. Thus, these experiments were also carried out using ethylene glycol which had been allowed to stand in air and thus attained an increased water content.

The results are shown in FIG. 1. In this figure, the axis of ordinates represents the amount of methanol distilled (ml) and the axis of abscissas, the ester-interchange reaction time (minutes). Curves $b_1$ and $b_2$ illustrate the results obtained with the catalyst solution (b) (calcium acetate monohydrate alone), the curve $b_1$ relating to the case where the water content of the ester-interchange reaction mixture in the early stage of the reaction was 0.02%, and the curve $b_2$ to the case where the water content was 0.04% by weight. Curves $c_1$ and $c_2$ illustrate the results with the catalyst solution (c) (cobalt acetate tetrahydrate alone), the curve $c_1$ relating to the case wherein the water content of the ester-interchange reaction mixture at the early stage of the reaction was 0.02% by weight, and the curve $c_2$ to the case where the water content was 0.04% by weight.

It can be seen from FIG. 1 that the calcium acetate catalyst has high catalytic activity in the early stage when the water content of the reaction mixture is 0.02% by weight (curve $b_1$), but the activity became markedly low in the intermediate and last stages of the reaction. In addition, when the water content of the ester-interchange reaction mixture became higher (curve $b_2$), the activity of the calciuum acetate catalyst became markedly low.

On the other hand, it can be seen that the catalytic activity of the cobalt acetate catalyst is scarcely affected by the water content of the ester-interchange reaction mixture (curves $c_1$ and $c_2$), and that in the intermediate and last stages of the ester-interchange reaction, the high catalytic activity of the cobalt acetate catalyst at the early stage can be substantially maintained.

These results demonstrate that in a catalyst system composed of calcium acetate and cobalt acetate, the reduction of the catalytic activity of calcium acetate at the intermediate and last stages of the reaction (especially when the water content of the reaction system is high) is made up for by cobalt acetate, and it serves to perform the reaction rapidly.

EXAMPLE 5

In the same way as in Example 1, (a), a catalyst solution with a water content of 1.20% by weight was prepared by dissolving 1.22 Kg of calcium acetate monohydrate and 0.18 Kg of cobalt acetate tetrahydrate in 30 Kg of ethylene glycol.

The same ester-interchange reactor as used in Example 1, (b) was charged with 2,000 Kg of dimethyl terephthalate, 1,250 Kg of ethylene glycol and all the catalyst solution thus prepared, and further with 0.82 Kg of antimony trioxide. The temperature was raised.

When the temperature of the inside of the reactor reached 150° C., methanol began to distill off, and in 140 minutes when the temperature of the inside of the reactor reached 220° C., 813 ml. of a distillate was obtained. At this time, 1.18 g of trimethyl phosphate (a trimethyl ester of phosphoric acid) was added, followed by stirring. Further an ethylene glycol slurry of titanium dioxide was added, and the mixture was stirred.

The resulting ester-interchange reaction product had a terminal methyl group concentration of 108 eq/$10^6$g.

Then, the ester-interchange reaction product was filtered, and polycondensed in the same way as in Example 1, (c) and (d) to form polyethylene terephthalate having the following properties. The filtration and the polycondensation reaction proceeded in substantially the same manner as in Example 1.

Terminal methyl group concentration: 5 eq/$10^6$ g
[$\eta$]: 0.61
[Sp]: 262.0° C.
DEG content: 0.81% by weight
Color: L-value 68.2, $b$-value 3.9

EXAMPLE 6

In the same way as in Example 1, (a), a substantially uniform solution of catalyst was prepared by mixing 30 Kg of ethylene glycol with 1.22 Kg of calcium acetate monohydrate and 54.8 g of cobalt acetate tetrahydrate.

The same ester-interchange reactor as used in Example 1, (b) was charged with 2,000 Kg of dimethyl terephthalate, 1,250 Kg of ethylene glycol and all the catalyst solution prepared above, and then, the temperature was raised.

When the temperature of the inside of the reactor reached about 150° C., methanol began to distill off. In 145 minutes when the temperature of the inside of the reaction tank reached 220° C., 820 ml. of a distillate was obtained. At this time, an ethylene glycol solution of trimethyl phosphate was added. After stirring, 0.82 Kg of antimony trioxide was added, and the mixture was stirred at 240° to 260° C. for 30 minutes. Then, 1.4 Kg of titanium dioxide was added as an ethylene glycol slurry, and the mixture was stirred for about 5 minutes. The resulting reaction mixture had a terminal methyl group concentration of 80 eq/$10^6$ g and the ester-interchange reaction conversion was 98.9%.

The ethylene glycol solution of trimethyl phosphate mentioned above had been prepared by heating 1.18 Kg of trimethyl phosphate and 3.5 Kg of ethylene glycol in an atmosphere of nitrogen at 140° C. under reflux for 5 hours, and then allowing the solution to cool.

The resulting ester-interchange reaction product was passed in the molten state in an atmosphere of nitrogen at 1.5 Kg/cm$^2$ through a filter screen (400 Tyler's mesh) with a filtration area of 1,700 cm$^2$, and then polycondensed in the same way as in Example 1, (d) to form polyethylene terephthalate having the following properties.

Terminal methyl group concentration: 4 eq/$10^6$g
[$\eta$]: 0.64
[Sp]: 263.0° C.
Color: L-value 62.0, $b$-value 1.0

The same procedure as above was repeated continuously using the same reactor (as in Example 2) to perform the ester-interchange reaction, filtration, and polycondensation. As a result, the $b$-values of the polymers obtained in the 10th to 13th batches increased to 1.3 on an average (the reason for this is not clear, but this phenomenon is frequently observed in such a continuous reaction). Hence, for the 14th to 19th batches, an ester-interchange reaction catalyst prepared in the following manner was used.

A solution of 100 g of cobalt acetate tetrahydrate in 2.8 Kg of ethylene glycol was freshly prepared, and 1/5 of the resulting solution was added to the abovementioned solution containing cobalt acetate tetrahydrate and calcium acetate monohydrate to mix them uniformly with stirring. The resulting solution was used as an ester-interchange reaction catalyst for the 14th to 19th batches.

As a result, the $b$-values of the polymers obtained in the 14th to 19th batches became 0.9 to 1.0, and the color of the polymer in the early batches was regained.

During the above reactions, no substantial difference in the ester-interchange reaction and the polycondensation reaction was observed between the 1st-9th batches and 14th-19th batches. The time required for filtering the ester-interchange reaction product in the 19th batch was 11 minutes, and therefore, it was not necessary to exchange the filter screen.

EXAMPLE 7

In the same way as in Example 1, (a), 31.4 Kg of a catalyst solution containing calcium acetate monohydrate and cobalt acetate tetrahydrate in equal concentrations was prepared.

The same ester-interchange reactor as used in Example 1, (b) was charged with 1,948 Kg of dimethyl terephthalate, 79.3 Kg of dimethyl 5-sodiumsulfoisophthalate (molecular weight 296.2), 1,250 Kg of ethylene glycol, the catalyst solution, and 2.24 Kg of sodium acetate trihydrate (molecular weight 136.1) as an ether inhibitor, and the temperature was raised.

The ester-interchange reaction was carried out under substantially the same conditions as described in Example 1, (b) to form an ester-interchange reaction product containing 0.69 Kg of phosphorous acid, 0.82 Kg of antimony trioxide and 10 Kg of titanium dioxide.

The ester-interchange reaction product was passed in the molten state in an atmosphere of nitrogen at 1.5 Kg/cm$^2$.G through a filter screen (300 Tyler's mesh) with a filtration area of 1,700 cm$^2$. The filtered product was then polycondensed in the same way as in Example 1, (d). The polycondensation time at reduced pressure was 180 minutes. The resulting polyester had an [$\eta$] of 0.48, an Sp of 258° C. and an L-value of 69 and a $b$-value of 4.9.

COMPARATIVE EXAMPLE 1

When only Calcium Acetate was used as an Ester-Interchange Reaction Catalyst a. An ethylene glycol solution of calcium acetate was prepared in the same way as in Example 3, (a) by dissolving 1.43 Kg of calcium acetate monohydrate in 30 Kg of ethylene glycol. The same ester-interchange reactor as used in Example 1, (b) was charged with 2,000 Kg of dimethyl terephthalate, 1,250 Kg of ethylene glycol and the ethylene glycol solution of calcium acetate prepared above. The temperature was raised to perform the ester-interchange reaction.

When the temperature of the inside of the reactor reached about 150° C., methanol began to distill out, and in 170 minutes when the inside temperature reached 225° C., about 830 ml. of a methanol distillate was obtained. At this time, 0.69 Kg of phosphorous acid was added to the reaction mixture, and the mixture was stirred. Then 0.82 Kg of antimony trioxide was added, and the mixture was stirred for 30 minutes at 240° to 260° C. Then, 10 Kg of titanium dioxide as an ethylene glycol slurry was further added, followed by stirring the mixture for about 5 minutes. The resulting reaction product had a terminal methyl group concentration of 25 eq/$10^6$ g which corresponded to an ester-interchange reaction conversion of 99.7%.

b. The ester-interchange reaction product obtained in (a) was passed in the molten state in an atmosphere of nitrogen at 1.5 Kg/cm².G through a filter screen (400 Tyler's mesh) with a filtration area of 1,700 cm².

c. The ester-interchange reaction product so filtered in (b) was polycondensed in the same way as in Example 1, (d) to afford a polyester having the following properties.

Terminal methyl concentration: 3 eq/$10^6$ g
[$\eta$]: 0.64
[Sp]: 261.5° C
DEG content: 1.14% by weight
Weight loss: 14.0% by weight Color: L-value 67.0, $b$-value 6.3

The procedure (a) to (c) above were continuously repeated using the same reactors (as in Example 2) to perform the ester-interchange reaction, filtration and polycondensation. The filter screen (400 Tyler's mesh) required a filtration time of 18 minutes in the 7th batch, and it was judged therefore that it could not endure use any longer.

The amount of the product filtration in the 7th batch was only about 10.5 Kg per cm² of filtration area.

A comparison of the results with those obtained in Example 1 and Example 2 showed that when only calcium acetate is used as an ester-interchange reaction catalyst, the resulting polyester undergoes a markedly great weight loss on heating (14% by weight) and has poor heat stability as compared with the case of using an ester-interchange reaction catalyst composed of calcium acetate and cobalt acetate and also it has a markedly large $b$-value (6.3) and is thus strongly yellowish. Furthermore, the amount of the reaction product filtered was only less than about 10.5 Kg per cm² of filtration area, and this shows that the filter screen should be exchanged about 3 times as frequently as in the case of using the combination catalyst.

COMPARATIVE EXAMPLE 2

When a solution of calcium acetate in ethylene glycol and a solution of cobalt acetate in ethylene glycol were separately added to the ester-interchange reaction system a. In the same way as in Example 3, 31.22 Kg of an ethylene glycol solution of calcium acetate monohydrate and 5.18 Kg of an ethylene glycol solution of cobalt acetate tetrahydrate having the same concentrations as described in Example 3, (a) were separately prepared.

b. 2,000 Kg of dimethyl terephthalate and 1,250 Kg of ethylene glycol were placed in the same ester-interchange reaction as used in Example 1, (b), and with stirring, the above-mentioned ethylene glycol solution of calcium acetate was added. After the addition, the ethylene glycol solution of cobalt acetate was added. Then, the temperature was raised, and the ester-interchange reaction was carried out. Then, the reaction mixture was treated in the same way as in Example 1, (b) to afford an ester-interchange reaction product having a terminal methyl group concentration of 106 eq/$10^6$ g containing 0.69 Kg of phosphorous acid, 0.82 Kg of antimony trioxide and 10 Kg of titanium dioxide.

c. The ester-interchange reaction product was passed in the molten state in an atmosphere of nitrogen at 1.5 Kg/cm².G. through a filter screen (400 Tyler's mesh) with a filtration area of 1,700 cm².

d. The ester-interchange reaction product obtained in (c) was polycondensed in the same way as in Example 1, (d) to afford a polyester having the following properties.

Terminal methyl group concentration: 5 eq/$10^6$g
[$\eta$]: 0.64
[Sp]: 262.5° C.
Color: L-value 68.3, $b$-value 3.5

The procedures (a) to (d) were continuously repeated using the same reactors (as in Example 2) to perform the ester-interchange reaction, filtration and polycondensation reaction. The time required for filtration through a filter screen (400 Tyler's mesh) was 16 minutes in the 5th batch, and it was judged that the filter screen was no longer usable. The amount of the reaction product filtration in the 5th batch was only about 7.6 Kg/cm² of filtration area.

The results demonstrate that the reduction in the number of filter exchangings cannot be achieved merely by adding calcium acetate and cobalt acetate as separately prepared ethylene glycol solutions to the ester-interchange reaction mixture, but it is necessary to use a uniform solution of calcium acetate and cobalt acetate dissolved in ethylene glycol as an ester-interchange reaction catalyst. It can further be seen by comparing the above results with those obtained in Comparative Example 1 in which only calcium acetate was used as the ester-interchange reaction catalyst that when cobalt acetate was added to the ester-interchange reaction mixture separately from calcium acetate, the filter screen had to be exchanged more frequently than in the case of using only calcium acetate as the ester-interchange reaction catalyst.

COMPARATIVE EXAMPLE 3

When calcium acetate alone is used as the ester-interchange reaction catalyst and after the end of the ester-interchange reaction, cobalt acetate is added The ester-interchange reaction when performed under the same conditions as in Comparative Example 1, (a). When about 830 ml. of a distillate was obtained, a solution of 0.18 Kg of cobalt acetate tetrahydrate in 5 Kg of ethylene glycol was added. The mixture was stirred for 5 minutes, and then treated in the same way as in Comparative Example 1 to afford an ester-interchange reaction product containing 0.69 Kg of phosphorous acid, 0.82 Kg of antimony trioxide and 10 Kg of titanium dioxide.

The reaction product was filtered and polycondensed in the same way as in Comparative Example 1, (b) and (c) to form a polyester.

The above procedures were continuously repeated using the same reactors (as in Example 1) to perform the ester-interchange reaction, filtration and polycondensation. The filtration time in the 4th batch was 16 minutes on a filter screen (400 Tyler's mesh) with a filtration area of 1,700 cm$^2$, and it was judged that the filter screen was no longer usable.

The polymers obtained in the four batches had a $b$-value of 3.5, 3.5, 3.6, and 3.5 respectively, and thus exhibited a good color. From this, it can be seen that cobalt acetate is effective for imparting a good color to the resulting polymer. However, as is clear from the above results, unless the cobalt acetate is added as a uniform solution of it and calcium acetate in ethylene glycol, it merely improves the color of the polymer, and does not result in the improvement of the filtration condition.

When a phosphorus compound is added to the ester-interchange reaction product to inactivate calcium acetate as the ester-interchange reaction catalyst, and then cobalt acetate is added to the ester-interchange reaction product, the color of the resulting polyester can be improved, but the filtrability of the ester-interchange reaction product cannot be improved and rather becomes inferior to that of the ester-interchange reaction product obtained by using only calcium acetate as the catalyst.

In order to facilitate the understanding of Examples 1 to 3 and 5 to 7 and Comparative Examples 1 to 3, the conditions that must be noted in the experimental examples and the differences in the properties of the resulting polyesters are shown in Tables 2 and 3 below.

Table 2

| Run No. | Catalyst | Addition of phosphorus compound - Kind and amount | Addition of phosphorus compound - Time of addition (when the ester-interchange reaction conversion reached the following value) | Filtration of the ester-interchange reaction product - Size of the filter (mesh) | Filtration of the ester-interchange reaction product - Filtration time (minutes) | Filtration of the ester-interchange reaction product - Amount of the product filtered until the filter became useless (Kg per cm$^2$ of filtration area) |
|---|---|---|---|---|---|---|
| Example 1 | A solution of 1.22 Kg of Ca(OCOCH$_3$)$_2$ . H$_2$O and 0.18 Kg of Co(OCOCH$_3$)$_2$ . 4H$_2$O in 30 Kg of ethylene glycol, prepared by homogenizing at room temperature for 45 minutes and then stirring the mixture at 80° C. for 2 hours. Water content 1.05% by weight | 0.69 Kg of phosphorous acid | 98.6% | 400 | ca. 5 | — |
| Example 2 | " | " | — | " | ca. 5 – 15 | 30.5 |
| Example 3 | A solution (a) of 1.22 Kg of Ca(OCOCH$_3$)$_2$ . H$_2$O in 30 Kg of ethylene glycol prepared by homogenizing for 45 minutes at room temperature and stirring the mixture at 40° C. for 3 hours, and a solution (b) of 0.18 Kg of Co(OCOCH$_3$)$_2$ . 4H$_2$O in 5 Kg of ethylene glycol. Solution (b) was added to solution (a), and stirred for about 10 minutes at room temperature. Water content 0.90% by weight. | 0.82 Kg of phosphoric acid | 98.9% | 300 | ca. 5 | — |
| Example 5 | The same solution as used in Example 1 except that its water content was 1.20% by weight; prepared in the same way. | 1.18 Kg of trimethyl phosphate | 98.6% | 400 | ca. 5 | — |
| Example 6 | A solution of 1.22 Kg of Ca(OCOCH$_3$)$_2$ . H$_2$O and 54.8 g of Co(OCOCH$_3$) . 4H$_2$O in 30 Kg of ethylene glycol, prepared in the same way as in Example 1. | 1.18 Kg of trimethyl phosphate as an ethylene glycol solution | 98.9% | 400 | ca. 5 | above 27.5 |
| Example 7 | same as in Example 1 | 0.69 Kg of phosphorous acid | — | 300 | ca. 5 | — |
| Comparative Example 1 | A solution of 1.43 Kg of Ca(OCOCH$_3$)$_2$ . H$_2$O in 30 Kg of ethylene glycol, prepared by homogenizing at room temperature for 45 minutes and stirring the mixture at 40° C. for 3 hours. | 0.69 Kg of phosphorous acid | 99.7% | 400 | ca. 6–18 | below 10.5 |
| Comparative Example 2 | The same Ca(OCOCH$_3$)$_2$ . H$_2$O solution and Co(OCOCH$_3$)$_2$ . 4H$_2$O solution as prepared in Example 3. These solutions were separately added to the ester-interchange reaction mixture. | 0.69 Kg of phosphorous acid | — | 400 | ca. 7–16 | below 7.6 |
| Comparative Example 3 | The same Ca(OCOCH$_3$)$_2$ . H$_2$O solution and Co(OCOCH$_3$)$_2$ . 4H$_2$O solution as prepared in Example 3. The former was added to the ester-interchange reaction system before the beginning of the ester-interchange reaction, and the latter was added to the ester-interchange reaction product | 0.69 Kg of phosphorous acid | — | 400 | ca. 7–16 | below 6 |

Table 2-continued

| Run No. | Catalyst | Addition of phosphorus compound - Kind and amount | Addition of phosphorus compound - Time of addition (when the ester-interchange reaction conversion reached the following value) | Filtration of the ester-interchange reaction product - Size of the filter (mesh) | Filtration of the ester-interchange reaction product - Filtration time (minutes) | Filtration of the ester-interchange reaction product - Amount of the product filtered until the filter became useless (Kg per cm² of filtration area) |
|---|---|---|---|---|---|---|
| | after adding the phosphorus compound | | | | | |

Table 3

| | Properties of Polyesters | | | | | | |
|---|---|---|---|---|---|---|---|
| | [CH₃] equivalents 10⁶g polymer | [η] | Sp. (°C) | Diethylene glycol content (% by wt. on polymer) | Weight loss (% by wt. on polymer) | Color L | Color b |
| Example 1 | 5 | 0.64 | 262.5 | 0.75 | 8.3 | 68.5 | +3.5 |
| Example 2 | — | 0.61 – 0.62 | — | — | — | — | — |
| Example 3 | 5 | 0.63 | 262.4 | 0.77 | 8.0 | 67.9 | +3.8 |
| Example 5 | 5 | 0.61 | 262.0 | 0.81 | — | 68.2 | +3.9 |
| Example 6 | 4 | 0.64 | 263.0 | — | — | 62.0 | +1.0 |
| Example 7 | — | 0.48 | 258.0 | — | — | 69.0 | +4.9 |
| Comparative Example 1 | 3 | 0.64 | 261.5 | 1.14 | 14.0 | 67.0 | +6.3 |
| Example 2 | 5 | 0.64 | 262.5 | — | — | 68.3 | +3.5 |
| Example 3 | — | — | — | — | — | — | +3.5 – +3.6 |

Table 3 uses LaTeX for subscripts where noted: $[CH_3]$ equivalents per $10^6$g polymer.

What we claim is:

1. A process for preparing a polyester which comprises reacting a di-lower alkyl ester of a difunctional carboxylic acid at least 90 mole% of which consists of terephthalic acid with a polymethylene glycol containing 2 to 10 carbon atoms at least 90 mole% of which consists of ethylene glycol in the presence of an ester-interchange reaction catalyst to form an ester-interchange reaction product, and then polycondensing it in the presence of a polycondensation catalyst, characterized in that a substantially uniform solution in ethylene glycol of (A) 20 to 150 millimole%, based on said di-lower alkyl ester of the difunctional carboxylic acid, of calcium acetate and (B) 2 to 25 millimole%, based on said di-lower alkyl ester, of cobalt acetate is used as the ester-interchange reaction catalyst and the ester-interchange reaction product is filtered through a filter having a size of 200 to 1,000 Tyler's mesh before carrying out the polycondensation of the ester-interchange reaction product.

2. The process of claim 1 wherein the di-lower alkyl ester of the difunctional carboxylic acid consists essentially of dimethyl terephthalate.

3. The process of claim 1 wherein the polymethylene glycol consists essentially of ethylene glycol.

4. The process of claim 1 wherein a substantially uniform solution in ethylene glycol of (A) 30 to 100 millimole%, based on said di-lower alkyl ester, of calcium acetate and (B) 3 to 20 millimole%, based on said di-lower alkyl ester, of cobalt acetate is used as the ester-interchange reaction catalyst.

5. The process of claim 1 wherein the ester-interchange reaction system contains 0.03 to 0.2% by weight of water.

6. The process of claim 5 wherein the ester-interchange reaction system contains 0.04 to 0.15% by weight of water.

7. The process of claim 1 wherein at least one phosphorus-containing compound selected from the group consisting of phosphorous acid, phosphoric acid, and lower alkyl esters, phenyl esters, and $C_{2-10}$ polymethylene glycol esters of these acids is added to the ester-interchange reaction system after the ester-interchange reaction has proceeded to an extent of at least 98% of theory but before the substantial completion of the reaction.

8. The process of claim 7 wherein the phosphorus-containing compound is selected from the group consisting of phosphorous acid, phosphoric acid, and methyl esters and ethylene glycol esters of these acids.

9. The process of claim 1 wherein the polycondensation catalyst is added to the ester-interchange reaction product while the ester-interchange reaction product still resides in a reactor for the ester-interchange reaction, and the mixture is stirred for at least 10 minutes at a temperature of 220° to 275° C.

10. The process of claim 1 wherein the polycondensation catalyst is added to the ester-interchange reaction product, and then a phosphorus-containing compound is added.

11. The process of claim 1 wherein the polycondensation catalyst is an antimony, germanium or titanium compound.

12. The process of claim 1 wherein the polycondensation catalyst is antimony trioxide.

13. The process of claim 1 wherein titanium dioxide is added to the ester-interchange reaction system as a delusterant.

* * * * *

UNITED STATES PATENT AND TRADEMARK OFFICE
CERTIFICATE OF CORRECTION

PATENT NO. : 4,058,507
DATED : November 15, 1977
INVENTOR(S) : Yorihiko Omoto et al It is certified that error appears in the above-identified patent and that said Letters Patent are hereby corrected as shown below:

```
Column 2, line 12, after "give" insert --a--
Column 4, line 25, change "along" to --alone--
Column 4, line 27, change "is" to --as--
Column 5, line 5, change "extend" to --extent--
Column 5, line 28, change "catalyst" to --catalytic--
Column 9, line 58, after "of" insert --a--
Column 10, line 32, change "1 mm" to --1 m--
Column 11, line 1, change "it" to --its--
Column 11, line 39, change "esterinter" to --ester-inter--

Column 12, line 16, change "terinterchange" to
    to --ester-interchange--
Column 17, line 36, change "the procedure" to
    --the procedures--
Column 18, lines 34-35, change "filtration" to --filtered--
Column 18, line 59, change "when" to --was--
Column 21, Table 3, third line - 2nd column,
    change "equivalents" to --(equivalents--
    same line, change "polymer" to --polymer)--
Column 12, line 15, delete "es-".
```

Signed and Sealed this

Ninth Day of May 1978

[SEAL]

Attest:

RUTH C. MASON
Attesting Officer

LUTRELLE F. PARKER
Acting Commissioner of Patents and Trademarks